UNITED STATES PATENT OFFICE 1,940,753

METHOD OF HEATING SETTLING LIQUIDS

Henry Howard, Newport, R. I.

No Drawing. Application March 19, 1931
Serial No. 523,950

1 Claim. (Cl. 210—59)

My invention relates to a method of heating liquids and particularly to a method of supplying heat to settling suspensions of solid materials in liquids.

A principal object of the invention is to eliminate the production of convection currents in settling liquids; other objects will appear from the description of the invention.

It is well-known that the rate of settling of suspensions is in general greater the hotter the liquid is maintained and in the case of some suspensions the maintenance of relatively high temperature during settling is essential in order to prevent the crystallization of salts, undue increase in viscosity or the like detrimental conditions.

However, the application of heat to the liquids by any of the methods heretofore proposed, for example, by the use of coils or jackets in or about the container or the direct injection of steam into the liquid, results in the production of convection currents which tend to redisperse the settling solids and to increase the time required for settling.

I have found that such undesirable convection currents may be avoided and the settling liquids held at, or raised to, the desired temperature without disturbing the rate of settling by supplying heat to the liquid through its upper surface by means of a layer of heated vapor, such as steam, in contact therewith.

In the application of the invention to the heating of an aqueous suspension during settling, the liquid is confined in a container having a tight heat-insulated cover and well jacketed sides, and steam is blown into the container below the top but above the surface of the liquid. The amount of steam is adjusted to maintain the liquid at the desired temperature. It is generally advantageous to use steam which is more or less superheated, in order to avoid unnecessary dilution of the liquid. For this purpose it is preferable to use exhaust steam, because of its cheapness, and to pass it through a suitable superheater before it enters the settling vessel. Satisfactory results are obtained by means of a superheater heated by steam at 70-100 pounds pressure. Of course, the higher the superheat the less dilution of the settling liquid will occur.

If it is desired to settle the liquid at very high temperatures a vessel capable of sustaining internal pressure may be used as the settling vessel and the steam blanket above the surface of the settling liquid may be maintained at the necessary superatmospheric pressure to hold the liquid at the desired temperature.

When settling suspensions in non-aqueous liquids other heated vapors than steam may be used as the heating medium.

The invention may be advantageously applied to rotary thickeners of the Dorr type. Due to the increased temperatures and greater speed of settling the size of the tank may be greatly decreased. The invention also makes possible the settling of solutions of a considerably higher concentration than was hitherto possible and thus decreases the volume of liquid which must be handled.

It will be seen that my invention broadly comprises a method of heating settling liquids by applying heat to the surface thereof and more particularly by maintaining a blanket of steam in contact with the surface of the settling liquid.

I claim:

A method of thickening liquids which comprises supplying to a body of the liquid to be thickened an additional quantity of the liquid to be thickened, removing liquid from said body at a point remote from said point of supply and adjacent the top surface of said body of liquid, establishing a substantially horizontal movement in said body of liquid between said point of supply and said point of removal, continuously removing settled solids from the lower portion of said body of liquid in a manner insufficient to produce substantial upward movement of the solids, and accelerating the settling of suspended solids in said liquid by supplying steam solely to the free upper surface of said body of liquid, the remaining surfaces of said body of liquid being insulated against substantial heat transfer.

HENRY HOWARD.